No. 631,027. Patented Aug. 15, 1899.
J. F. McCANN.
MACHINE FOR CUTTING AND PLANTING POTATOES.
(Application filed Feb. 3, 1898.)
(No Model.)
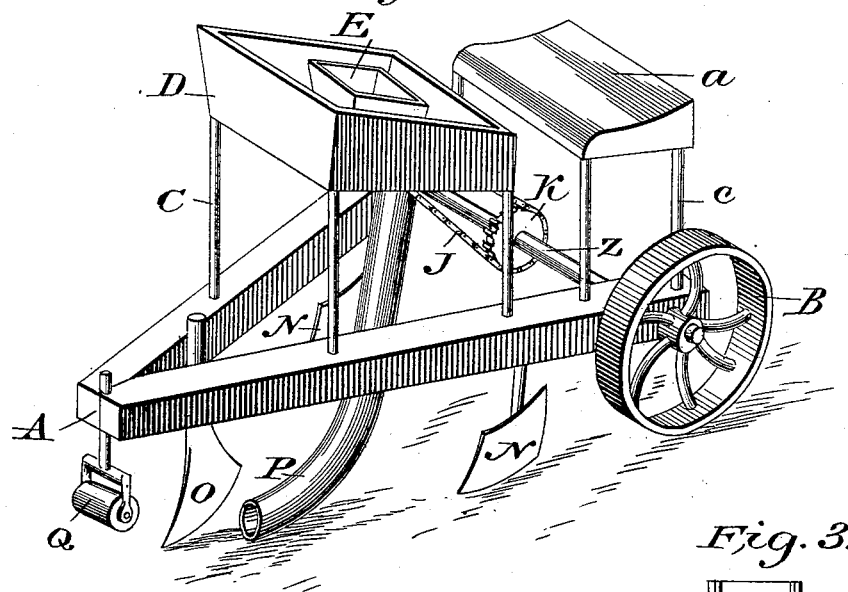
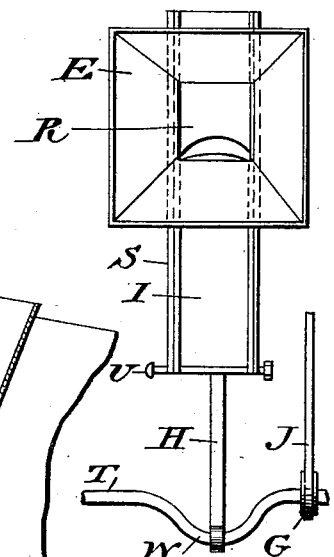
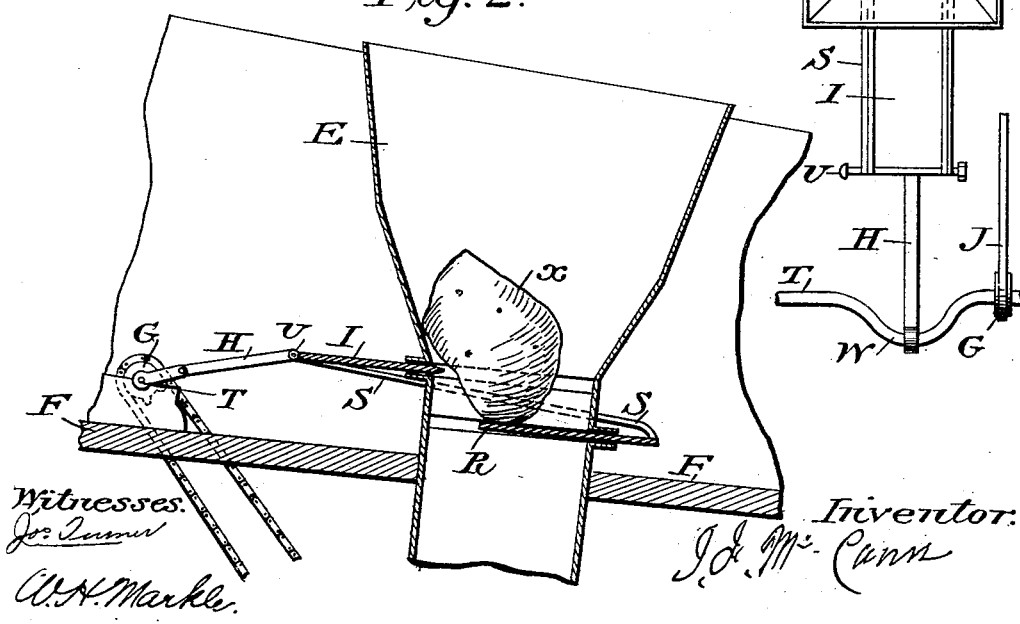
Witnesses:
Jos Turner
W. H. Markle
Inventor:
J. F. McCann

UNITED STATES PATENT OFFICE.

JOHN FREDERIC McCANN, OF TORONTO, CANADA.

MACHINE FOR CUTTING AND PLANTING POTATOES.

SPECIFICATION forming part of Letters Patent No. 631,027, dated August 15, 1899.

Application filed February 3, 1898. Serial No. 668,949. (No model.)

*To all whom it may concern:*

Be it known that I, JOHN FREDERIC MC-CANN, of the city of Toronto, in the county of York, in the Province of Ontario, Canada, have invented certain new and useful Improvements in Machines for Cutting, Planting, and Covering Potatoes in Drills; and I hereby declare that the following is a full, clear, and exact description of the same.

My invention relates to improvements in that class of machines which are used for cutting, planting, and covering potatoes in drills.

The object of my invention is to construct a machine which will cut a potato into a number of parts, convey the cut portions to a drill, and cover same, the whole operation being done automatically, the operator having only to feed to the feed-box one potato at a time. Simplicity and cheapness of construction are also combined in my invention.

For a full comprehension of my invention reference must be had to the accompanying drawings, forming part of this specification, in which similar letters of reference indicate like parts.

Figure 1 is a perspective view of my machine. Fig. 2 is a vertical section detail of the cutting-box. Fig. 3 is a plan of the knife and slide, showing the movement of same, also the crank movement for driving the knife.

The framework of my machine consists of a V-shaped frame A, the supports C of the table F, the seat $a$, and its supports $c$ $c$. On top of the table F, I place a box D, into which the seed-potatoes are thrown. Inside this box D is the feed box or funnel E, to which the potatoes are fed by hand one at a time and by means of which the potato is fed to the knife I, and when it is severed for planting the portion ready for planting is conveyed to the drill through the funnel P.

For comprehension of the manner in which the potato is cut reference must be had to Fig. 2. I is the cutting-knife, which has connected to it by means of the rods S a slide R, which slide forms a sliding bottom for the feed box or funnel E, the knife I and slide R being connected by the rod U. H is a pitman connecting the rod U with the bent axle T. G is a sprocket-wheel on the bent axle T, which sprocket is driven by a chain J, connected with the sprocket K on the driving-axle Z. B are the ordinary driving-wheels, and O is a plow secured to the frame A, which makes a drill, into which the cut portion of the seed prepared for planting is dropped, being there conveyed by the conveying-funnel P. The seed is covered by the blades N N, which are likewise attached to the frame A. Q is a small wheel in front of the machine, which works on a pivot and may be raised or lowered to make a drill of any desired depth.

I will now describe the operation of my machine.

The driver is seated on the seat $a$. The potatoes are thrown into the supply-box D. The driver takes one potato at a time and drops the same into the feed box or funnel E, down which it falls until it reaches the slide or false bottom R. It rests on this until the knife I is propelled forward by means of the bent shaft T and pitman H, when the knife passes through the potato. As the knife I and slide R are connected by means of the rods S, it will be readily understood that the slide has the same motion as the knife, and as the latter comes forward the former also moves in the same direction, thus allowing the cut portion to drop down the conveying-funnel P. The uncut portion of the potato is held by the knife I, and when the knife I is withdrawn the potato drops until caught by the slide R, when the same operation is repeated.

When the knife I is propelled by the driving-gear in the manner of cutting, a vibrating motion is produced which causes the potato to bounce and turn over and therefore present a different angle to the knife, and the potato instead of being sliced is cut into triangular parts the same as though cut by hand.

I am aware that prior to my invention potato cutters and planters have been manufactured with hoppers and cutting-knives in conjunction with detainers, most of which machines are hill-planters. Therefore I do not broadly claim a patent on the entire combination of my machine; but What I do claim as my invention, and desire to secure by Letters Patent, is—

In a potato-planter, the supply-hopper D, mounted upon standards C, on the frame A, provided with a central funnel E and conductor P, in combination with the reciprocating frame carrying the false bottom R, and knife I, whereby the potatoes are cut and alternately discharged into the furrow formed by the plow O, and covered by the blades N N, all substantially as shown and described.

Dated at Toronto, Canada, January 25, A. D. 1898.

JOHN FREDERIC McCANN.

In presence of—
  N. F. HODGSON,
  F. J. STANLEY.